US012780260B2

(12) United States Patent
Fan et al.

(10) Patent No.: US 12,780,260 B2
(45) Date of Patent: Nov. 3, 2026

(54) METHOD FOR PREDICTING VEHICLE TRAJECTORY, CONTROL APPARATUS, AND VEHICLE

(71) Applicant: Anhui NIO Autonomous Driving Technology Co., Ltd., Hefei (CN)

(72) Inventors: Haoyang Fan, Hefei (CN); Hailong Qin, Hefei (CN); Shaoqing Ren, Hefei (CN); Jingyuan Ma, Hefei (CN); Gang Sun, Hefei (CN); Shaohua Zheng, Hefei (CN); Qiuyi Li, Hefei (CN); Xiaoxin Fu, Hefei (CN)

(73) Assignee: Anhui NIO Autonomous Driving Technology Co., Ltd., Hefei (CN)

( * ) Notice: Subject to any disclaimer, the term of this patent is extended or adjusted under 35 U.S.C. 154(b) by 156 days.

(21) Appl. No.: 18/532,275

(22) Filed: Dec. 7, 2023

(65) Prior Publication Data

US 2025/0091619 A1 Mar. 20, 2025

(30) Foreign Application Priority Data

Sep. 20, 2023 (CN) ......................... 202311221693.2

(51) Int. Cl.
*B60W 60/00* (2020.01)

(52) U.S. Cl.
CPC . *B60W 60/0027* (2020.02); *B60W 2554/4046* (2020.02)

(58) Field of Classification Search
None
See application file for complete search history.

(56) References Cited

U.S. PATENT DOCUMENTS

2017/0158193 A1 6/2017 Lopez et al.
2019/0217857 A1 7/2019 Sorin et al.
(Continued)

FOREIGN PATENT DOCUMENTS

WO WO 2022/033810 2/2022
WO WO 2022/214414 10/2022
WO WO-2023004698 A1 * 2/2023 ........ B60W 60/0027

OTHER PUBLICATIONS

English translation of WO-2023004698-A1 (Year: 2023).*
Extended Search Report for European Patent Application No. 23206591.2, dated Apr. 5, 2024, 9 pages.

*Primary Examiner* — Steven Vu Nguyen
*Assistant Examiner* — Melanie G Huber
(74) *Attorney, Agent, or Firm* — Sheridan Ross PC

(57) ABSTRACT

The disclosure relates to autonomous driving, and provides a method for predicting a vehicle trajectory. In the method, scenario interaction results of a traffic agent are obtained based on a static environment perception result and a traffic agent perception result of a vehicle at a current moment, an initial interaction scenario is obtained based on the scenario interaction results, interaction scenario simulation is performed based on the initial interaction scenario and an ego vehicle driving decision to determine an optimal interaction scenario evolution feature of the traffic agent, and an optimal driving trajectory of the vehicle is obtained based on the optimal interaction scenario evolution feature and a state of the vehicle. An optimal interaction scenario evolution process is selected from numerous interaction scenarios by comprehensively considering impact of the ego vehicle driving decision on an environment of the vehicle, thereby obtaining a more accurate optimal driving trajectory.

12 Claims, 4 Drawing Sheets

(56) References Cited

U.S. PATENT DOCUMENTS

| | | | | |
|---|---|---|---|---|
| 2021/0049415 | A1* | 2/2021 | Whiteson | G06N 3/045 |
| 2021/0276547 | A1* | 9/2021 | Narayanan | B60W 30/0956 |
| 2021/0370980 | A1 | 12/2021 | Ramamoorthy et al. | |
| 2022/0017122 | A1* | 1/2022 | Malla | G06N 3/049 |
| 2023/0154308 | A1* | 5/2023 | Nave | G06F 30/20 340/539.13 |
| 2023/0222268 | A1* | 7/2023 | Muehlenstaedt | G05D 1/0217 703/1 |
| 2024/0116533 | A1* | 4/2024 | Pu | G06T 17/005 |
| 2024/0202393 | A1* | 6/2024 | Dobre | B60W 60/0011 |

* cited by examiner

METHOD FOR PREDICTING VEHICLE TRAJECTORY, CONTROL APPARATUS, AND VEHICLE

CROSS-REFERENCE TO RELATED APPLICATIONS

This application claims the benefit of and priority to Chinese Patent Application No. 202311221693.2 filed on Sep. 20, 2023, the entire disclosure of which is hereby incorporated herein by reference, in its entirety, for all that it teaches and for all purposes.

TECHNICAL FIELD

The disclosure relates to the technical field of autonomous driving, and specifically provides a method for predicting a vehicle trajectory, a control apparatus, and a vehicle.

BACKGROUND

In an autonomous driving system, a planning and control function can receive surrounding environment information input from a perception layer to form a motion trajectory and a control input required for an actuator.

With the exponential expansion of driving scenarios, autonomous driving functions need to have the ability to conduct complex interactions with obstacle scenarios. However, a conventional rule-based planning and control (PNC) algorithm faces difficulties in iteration when new scenario interactions emerge in large numbers.

Accordingly, there is a need for a new vehicle control solution in the art to solve the above problem.

BRIEF SUMMARY

In order to overcome the above defect, the disclosure is proposed to solve or at least partially solve the problem of how to effectively deal with existing highly complex traffic scenario interactions and difficulties in iteration of a planning and control process.

According to a first aspect, the disclosure provides a method for predicting a vehicle trajectory. The method includes:

obtaining, based on a static environment perception result and a traffic agent perception result of the vehicle at a current moment, a plurality of scenario interaction results of each traffic agent in an environment of the vehicle at the current moment, where the scenario interaction results indicate different interaction intentions of the traffic agents;

obtaining an initial interaction scenario based on scenario interaction results of all traffic agents, where the interaction scenario is a distribution of interaction intentions of different traffic agents at a corresponding moment;

performing interaction scenario simulation based on the initial interaction scenario and an ego vehicle driving decision of the vehicle to obtain an optimal interaction scenario evolution feature; and obtaining an optimal driving trajectory of the vehicle based on the optimal interaction scenario evolution feature and a state of the vehicle.

In a technical solution of the foregoing method for predicting a vehicle trajectory, the performing interaction scenario simulation based on the initial interaction scenario and an ego vehicle driving decision of the vehicle to obtain an optimal interaction scenario evolution feature includes:

obtaining interaction scenarios at a plurality of consecutive moments in the future based on the initial interaction scenario and the ego vehicle driving decision of the vehicle; and obtaining the optimal interaction scenario evolution feature based on a plurality of the interaction scenarios.

In a technical solution of the foregoing method for predicting a vehicle trajectory, the obtaining interaction scenarios at a plurality of consecutive moments in the future based on the initial interaction scenario and the ego vehicle driving decision of the vehicle includes:

obtaining, for each moment, a plurality of interaction scenarios at the current moment based on interaction scenarios at the previous moment and the ego vehicle driving decision of the vehicle; and obtaining, based on scenario values of the interaction scenarios, an interaction scenario having the highest scenario value at the current moment as a final interaction scenario at the current moment, thereby obtaining the interaction scenarios at the plurality of consecutive moments in the future.

In a technical solution of the foregoing method for predicting a vehicle trajectory, the method further includes determining the scenario values of the interaction scenarios according to the following step:

obtaining the values of the interaction scenarios through a trained preset learned interaction value network, where the trained learned interaction value network is obtained by training based on annotated human driving behavior data, and the trained learned interaction value network assigns a higher scenario value to an interaction scenario that conforms to human driving behavior.

In a technical solution of the foregoing method for predicting a vehicle trajectory, the obtaining the optimal interaction scenario evolution feature based on a plurality of the interaction scenarios includes:

obtaining, based on a plurality of the interaction scenarios, a semantic decision space and a feasible convex driving corridor of each interaction scenario, where the semantic decision space includes interaction intentions of traffic agents in an interaction scenario having the highest scenario value, and the feasible convex driving corridor is time and space constraints on the interaction intentions; and using the semantic decision space and the feasible convex driving corridor as the optimal interaction scenario evolution feature.

In a technical solution of the foregoing method for predicting a vehicle trajectory, the obtaining an optimal driving trajectory of the vehicle based on the optimal interaction scenario evolution feature and a state of the vehicle includes:

performing, based on the optimal interaction scenario evolution feature, corresponding interaction intention encoding on each interaction intention included in the semantic decision space, and obtaining a reward function corresponding to the interaction intention;

obtaining a total interaction reward function based on a plurality of interaction intentions and a reward function for each interaction intention; and obtaining the optimal driving trajectory of the vehicle from the feasible convex driving corridor based on the total interaction reward function and the state of the vehicle.

In a technical solution of the foregoing method for predicting a vehicle trajectory, the performing, based on the optimal interaction scenario evolution feature, corresponding interaction intention encoding on each interaction intention included in the semantic decision space includes:

performing spatio-temporal joint feature embedding based on the optimal interaction scenario evolution feature, to obtain a spatio-temporal joint feature embedding result, where the spatio-temporal joint feature embedding refers to feature embedding encoding, in the feasible convex driving corridor, of temporal features and spatial features of the traffic agents in the semantic decision space; and performing corresponding interaction intention encoding on each interaction intention based on the spatio-temporal joint feature embedding result, to obtain an interaction encoding result.

In a technical solution of the foregoing method for predicting a vehicle trajectory, the obtaining a reward function corresponding to the interaction intention includes:

training, based on human driving behavior data, the reward function in the feasible convex driving corridor to minimize a difference between an ego vehicle driving decision corresponding to the reward function and the human driving behavior data, thereby obtaining the reward function corresponding to the interaction intention.

In a technical solution of the foregoing method for predicting a vehicle trajectory, the obtaining, based on a static environment perception result and a traffic agent perception result of the vehicle at a current moment, a plurality of scenario interaction results of each traffic agent in an environment of the vehicle at the current moment includes:

performing attention interaction encoding based on the static environment perception result and the traffic agent perception result to obtain an interaction encoding feature;

performing attention decoding on the interaction encoding feature to obtain an attention decoding result; and obtaining the plurality of scenario interaction results based on the attention decoding result.

In a technical solution of the foregoing method for predicting a vehicle trajectory, the performing attention interaction encoding based on the static environment perception result and the traffic agent perception result to obtain an interaction encoding feature includes:

performing attention interaction for the traffic agent perception results of different traffic agents to obtain a traffic agent interaction feature;

fusing the traffic agent interaction feature and a temporal feature to obtain a traffic agent fusion feature; and performing attention interaction for the traffic agent fusion feature and the static environment perception result to obtain the interaction encoding feature.

According to a second aspect, a control apparatus is provided. The control apparatus includes at least one processor and at least one storage apparatus adapted to store a plurality of program codes, where the program codes are adapted to be loaded and executed by the processor to perform the method for predicting a vehicle trajectory, the method comprising:

obtaining, based on a static environment perception result and a traffic agent perception result of the vehicle at a current moment, a plurality of scenario interaction results of each traffic agent in an environment of the vehicle at the current moment, wherein the scenario interaction results represent different interaction intentions of the traffic agents;

obtaining an initial interaction scenario based on scenario interaction results of all traffic agents, wherein the interaction scenario is a distribution of interaction intentions of different traffic agents at a corresponding moment;

performing interaction scenario simulation based on the initial interaction scenario and an ego vehicle driving decision to obtain an optimal interaction scenario evolution feature; and obtaining an optimal driving trajectory of the vehicle based on the optimal interaction scenario evolution feature and a state of the vehicle.

In a technical solution of the foregoing control apparatus, wherein the performing interaction scenario simulation based on the initial interaction scenario and an ego vehicle driving decision to obtain an optimal interaction scenario evolution feature comprises:

obtaining interaction scenarios at a plurality of consecutive moments in the future based on the initial interaction scenario and the ego vehicle driving decision; and obtaining the optimal interaction scenario evolution feature based on a plurality of the interaction scenarios.

In a technical solution of the foregoing control apparatus, wherein the obtaining interaction scenarios at a plurality of consecutive moments in the future based on the initial interaction scenario and the ego vehicle driving decision comprises:

obtaining, for each moment, a plurality of interaction scenarios at the current moment based on interaction scenarios at the previous moment and the ego vehicle driving decision; and obtaining, based on scenario values of the interaction scenarios, an interaction scenario having the highest scenario value at the current moment as a final interaction scenario at the current moment, thereby obtaining the interaction scenarios at the plurality of consecutive moments in the future.

In a technical solution of the foregoing control apparatus, wherein the method further comprises determining the scenario values of the interaction scenarios according to the following step:

obtaining the values of the interaction scenarios through a learned interaction value network, wherein the learned interaction value network is obtained by training based on labeled human driving behavior data, and the learned interaction value network assigns a higher scenario value to an interaction scenario that conforms to human driving behavior.

In a technical solution of the foregoing control apparatus, wherein the obtaining the optimal interaction scenario evolution feature based on a plurality of the interaction scenarios comprises:

obtaining, based on a plurality of the interaction scenarios, a semantic decision space and a feasible convex driving corridor of each interaction scenario, wherein the semantic decision space comprises interaction intentions of traffic agents in an interaction scenario having the highest scenario value, and the feasible convex driving corridor is temporal and spatial constraints on the interaction intentions; and using the semantic decision space and the feasible convex driving corridor as the optimal interaction scenario evolution feature.

In a technical solution of the foregoing control apparatus, wherein the obtaining an optimal driving trajectory of the vehicle based on the optimal interaction scenario evolution feature and a state of the vehicle comprises:

performing, based on the optimal interaction scenario evolution feature, corresponding interaction intention encoding on each interaction intention comprised in the semantic decision space, and obtaining a reward function corresponding to the interaction intention;

obtaining a joint interaction reward function based on a plurality of interaction intentions and the reward function corresponding to each interaction intention; and obtaining the optimal driving trajectory of the vehicle from the feasible convex driving corridor based on the joint interaction reward function and the state of the vehicle.

In a technical solution of the foregoing control apparatus, wherein the performing, based on the optimal interaction scenario evolution feature, corresponding interaction intention encoding on each interaction intention comprised in the semantic decision space comprises:

performing spatio-temporal joint feature embedding based on the optimal interaction scenario evolution feature, to obtain a spatio-temporal joint feature embedding result, wherein the spatio-temporal joint feature embedding refers to feature embedding encoding, in the feasible convex driving corridor, of temporal features and spatial features of the traffic agents in the semantic decision space; and performing corresponding interaction intention encoding on each interaction intention based on the spatio-temporal joint feature embedding result, to obtain an interaction encoding result.

In a technical solution of the foregoing control apparatus, wherein the obtaining a reward function corresponding to the interaction intention comprises:

training, based on human driving behavior data, the reward function in the feasible convex driving corridor to minimize a difference between the ego vehicle driving decision corresponding to the reward function and the human driving behavior data, thereby obtaining the reward function corresponding to the interaction intention.

In a technical solution of the foregoing control apparatus, wherein the obtaining, based on a static environment perception result and a traffic agent perception result of the vehicle at a current moment, a plurality of scenario interaction results of each traffic agent in an environment of the vehicle at the current moment comprises:

performing attention interaction encoding based on the static environment perception result and the traffic agent perception result to obtain an interaction encoding feature;

performing attention decoding on the interaction encoding feature to obtain an attention decoding result; and obtaining the plurality of scenario interaction results based on the attention decoding result.

According to a third aspect, a vehicle is provided. The vehicle includes the control apparatus in the technical solution of the foregoing control apparatus.

The above one or more technical solutions of the disclosure have at least one or more of the following beneficial effects:

In the technical solutions for implementing the disclosure, according to the disclosure, scenario interaction results of each traffic agent in an environment of a vehicle at a current moment are obtained based on a static environment perception result and a traffic agent perception result of the vehicle at the current moment, an initial interaction scenario is obtained based on the scenario interaction results, interaction scenario simulation is performed based on the initial interaction scenario and an ego vehicle driving decision to determine an optimal interaction scenario evolution feature of the traffic agent, and an optimal driving trajectory of the vehicle is obtained based on the optimal interaction scenario evolution feature and a state of the vehicle. Through the above configuration, the disclosure allows for obtaining multimodal scenario interaction results of each traffic agent by comprehensively considering the static environment perception result and the traffic agent perception result, so that the scenario interaction results can comprehensively consider dynamic features and static features in the environment of the vehicle; the scenario interaction simulation is performed based on the initial interaction scenario and the ego vehicle driving decision, and an optimal interaction scenario evolution process can be selected from numerous interaction scenarios by comprehensively considering impact of the ego vehicle driving decision on the environment of the vehicle, thereby obtaining the optimal interaction scenario evolution feature; and then a search for the optimal driving trajectory is performed based on the optimal interaction scenario evolution feature and the state of the vehicle, so that a more accurate optimal driving trajectory can be obtained. The disclosure allows for effectively reducing dimensionality of a highly complex interaction scenario and finding an optimal driving trajectory, effectively solving the problem of difficulties in iteration of a planning and control algorithm and enabling a user to obtain a safer and more comfortable driving experience.

BRIEF DESCRIPTION OF THE SEVERAL VIEWS OF THE DRAWINGS

The disclosed content of the disclosure will become more readily understood with reference to the accompanying drawings. Those skilled in the art readily understand that these accompanying drawings are merely for illustrative purposes and are not intended to limit the scope of protection of the disclosure. In the drawings.

DETAILED DESCRIPTION

Some implementations of the disclosure are described below with reference to the accompanying drawings. Those skilled in the art should understand that these implementations are only used to explain the technical principles of the disclosure, and are not intended to limit the scope of protection of the disclosure.

In the description of the disclosure, a "module" or "processor" may include hardware, software, or a combination thereof. A module may include a hardware circuit, various suitable sensors, a communication port, and a memory, or may include a software part, for example, program code, or may be a combination of software and hardware. The processor may be a central processing unit, a microprocessor, a graphics processing unit, a digital signal processor, or any other suitable processor. The processor has a data and/or signal processing function. The processor may be implemented in software, hardware, or a combination thereof. A non-transitory computer-readable storage medium includes any suitable medium that may store program codes, for example, a magnetic disk, a hard disk, an optical disc, a flash memory, a read-only memory, or a random access memory. The term "A and/or B" indicates all possible combinations of A and B, for example, only A, only B, or A and B. The term "at least one of A or B" or "at least one of A and B" has a meaning similar to "A and/or B" and may include only A, only B, or A and B. The terms "a/an" and "this" in the singular form may also include the plural form.

Figure 1:
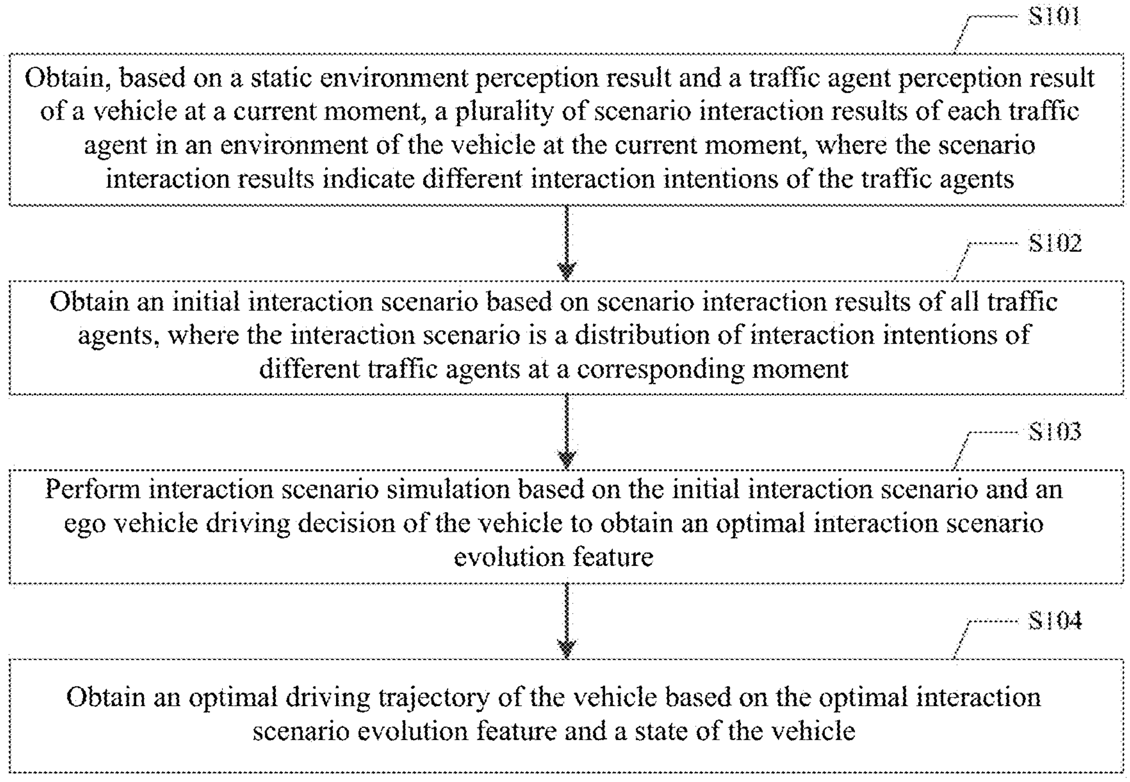
FIG. 1 is a schematic flowchart of main steps of a method for predicting a vehicle trajectory according to an embodiment of the disclosure.

Referring to FIG. 1, FIG. 1 is a schematic flowchart of main steps of a method for predicting a vehicle trajectory according to an embodiment of the disclosure. As shown in FIG. 1, the method for predicting a vehicle trajectory in this embodiment of the disclosure mainly includes the following steps S101 to S104.

Step S101: Obtain, based on a static environment perception result and a traffic agent perception result of a vehicle at a current moment, a plurality of scenario interaction results of each traffic agent in an environment of the vehicle at the current moment, where the scenario interaction results indicate different interaction intentions of the traffic agents;

In this embodiment, the plurality of scenario interaction results of the traffic agent may be obtained based on the static environment perception result and the traffic agent perception result of the vehicle at the current moment.

In an implementation, the static environment perception result and the traffic agent perception result may be obtained based on a perception algorithm. The static environment perception result may be bird's eye view (BEV) map encoding, such as a detection result of lane lines, curbs, etc. The traffic agent perception result may be an encoding result of a static obstacle and a dynamic obstacle that is output using the perception algorithm.

In an implementation, the scenario interaction result may be different interaction intentions of each traffic agent, and then constitute multimodal interactions of the traffic agent. For example, in a current environment, a traffic agent (Agent) may execute interaction intentions such as going straight, turning left, and cutting in. These interaction intentions may constitute a scenario interaction result of the traffic agent.

Figure 2:
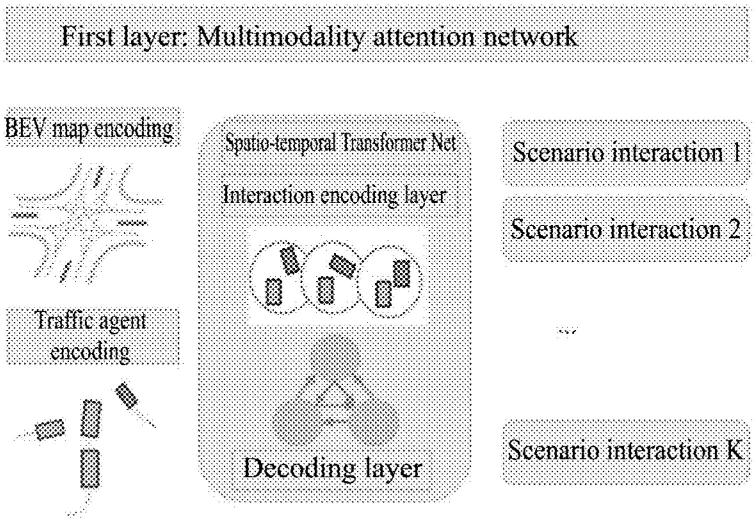
FIG. 2 is a schematic diagram of main components of a multimodality attention network according to an implemented embodiment of the disclosure.

In an implementation, reference may be made to FIG. 2. FIG. 2 is a schematic diagram of main components of a multimodality attention network according to an implemented embodiment of the disclosure. As shown in FIG. 2, based on a transformer network (Net), encoding can be performed by an interaction encoding layer based on BEV encoding (the static environment perception result) and traffic agent encoding (the traffic agent perception result), and decoding is performed by a decoding layer based on an encoding result, to obtain a plurality of scenario interaction results (a scenario interaction 1, a scenario interaction 2, . . . , a scenario interaction k). The transformer network is a neural network architecture based on a self-attention mechanism, and includes an encoder and a decoder, each of them composed of a plurality of layers of stacked self-attention and feedforward neural networks.

Step S102: Obtain an initial interaction scenario based on scenario interaction results of all traffic agents, where the interaction scenario is a distribution of interaction intentions of different traffic agents at a corresponding moment.

In this embodiment, a distribution of interaction intentions, i.e., the interaction scenario, of each traffic agent at the current moment may be obtained based on the scenario interaction results of all the traffic agents. In other words, the interaction scenario is a collection that combines the scenario interaction results of all the traffic agents in the current environment. For example, the interaction scenario consists of a scenario interaction result 1, a scenario interaction result 3, and a scenario interaction result 4. The scenario interaction result 1 is that an agent 1bypasses an agent 3. The scenario interaction result 3 is that an agent 2 bypasses an agent 4. The scenario interaction result 4 is that an oncoming vehicle of the agent 3bypasses an agent 7. Then the interaction scenario is as follows: The agent 1 bypasses the agent 3, the agent 2 bypasses the agent 4, and the oncoming vehicle of the agent 3 bypasses the agent 7. An agent is a traffic agent.

Figure 3:
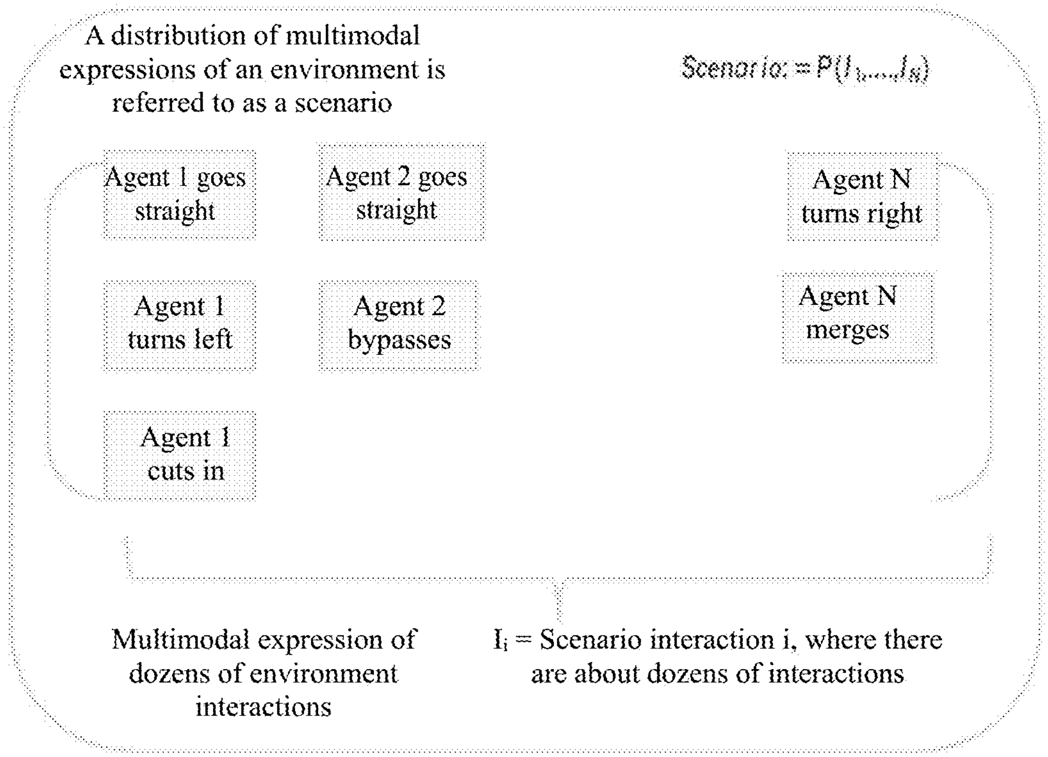
FIG. 3 is a schematic diagram of an interaction scenario composition according to an implementation of an embodiment of the disclosure.

In an implementation, reference may be made to FIG. 3. FIG. 3 is a schematic diagram of an interaction scenario composition according to an implementation of an embodiment of the disclosure. As shown in FIG. 3, a distribution of multimodal expressions of an environment is referred to as a scenario (i.e., an interaction scenario); Scenario io (interaction scenario)=$P(I_1, \ldots, I_N)$, where Ii=scenario interaction result i, and there are about dozens of scenario interaction results; and the interaction scenario is a multimodal expression of a distribution of interaction intentions of a plurality of traffic agents in the environment.

Step S103: Perform interaction scenario simulation based on the initial interaction scenario and an ego vehicle driving decision of the vehicle to obtain an optimal interaction scenario evolution feature.

In this embodiment, the interaction scenario may be deduced based on the initial interaction scenario and the ego vehicle driving decision, so as to obtain the optimal interaction scenario evolution feature. To be specific, after the initial interaction scenario is determined, the ego vehicle driving decision may cause changes in the environment, and the changes in the environment may further lead to a plurality of interaction scenarios at a next moment, which continuously extends the interaction scenario, thereby achieving the interaction scenario simulation; and an optimal simulation path is selected from an interaction scenario simulation result to obtain the optimal interaction scenario evolution feature. The optimal interaction scenario evolution feature represents a combination of optimal interaction scenarios at a plurality of consecutive moments.

In an implementation, the interaction scenario simulation may be performed in the form of a search tree.

In an implementation, the optimal simulation path may be obtained through a beam search algorithm.

In an implementation, the optimal simulation path may be obtained through a greedy search algorithm.

Step S104: Obtain an optimal driving trajectory of the vehicle based on the optimal interaction scenario evolution feature and a state of the vehicle.

In this embodiment, the optimal driving trajectory of the vehicle may be obtained based on the optimal interaction scenario evolution feature and the state of the vehicle. To be specific, in the combination of optimal interaction scenarios at the plurality of consecutive moments, a search for the optimal driving trajectory is performed based on the state of the vehicle.

Based on the above steps S101 to S104, according to this embodiment of the disclosure, scenario interaction results of each traffic agent in an environment of a vehicle at a current moment are obtained based on a static environment perception result and a traffic agent perception result of the vehicle at the current moment, an initial interaction scenario is obtained based on the scenario interaction results, interaction scenario simulation is performed based on the initial interaction scenario and an ego vehicle driving decision to determine an optimal interaction scenario evolution feature of the traffic agent, and an optimal driving trajectory of the vehicle is obtained based on the optimal interaction scenario evolution feature and a state of the vehicle. Through the above configuration, this embodiment of the disclosure allows for obtaining multimodal scenario interaction results of each traffic agent by comprehensively considering the static environment perception result and the traffic agent perception result, so that the scenario interaction results can comprehensively consider dynamic features and static features in the environment of the vehicle; the scenario interaction simulation is performed based on the initial interaction scenario and the ego vehicle driving decision, and an optimal interaction scenario evolution process can be selected from numerous interaction scenarios by comprehensively considering impact of the ego vehicle driving decision on the environment of the vehicle, thereby obtaining the optimal interaction scenario evolution feature; and then a search for the optimal driving trajectory is performed based on the optimal interaction scenario evolution feature and the state of the vehicle, so that a more accurate optimal driving trajectory can be obtained. This embodiment of the disclosure allows for effectively reducing dimensionality of a highly complex interaction scenario and finding an optimal driving trajectory, effectively solving the problem of difficulties in iteration of a planning and control algorithm and enabling a user to obtain a safer and more comfortable driving experience.

Step S101, step S102, and step S104 each are further described below.

In an implementation of this embodiment of the disclosure, step S101 may further include step S1011 to step S1013 as follows.

Step S1011: Perform attention interaction encoding based on the static environment perception result and the traffic agent perception result to obtain an interaction encoding feature.

In an implementation, step S1011 may further include step S10111 to step S10113 as follows.

Step S10111: Perform attention interaction for the traffic agent perception results of different traffic agents to obtain a traffic agent interaction feature.

Step S10112: Fuse the traffic agent interaction feature and a temporal feature to obtain a traffic agent fusion feature.

Step S10113: Perform attention interaction for the traffic agent fusion feature and the static environment perception result to obtain the interaction encoding feature.

In this implementation, interaction encoding (attention interaction) may be performed on traffic agent encoding (traffic agent perception results) of different traffic agents to obtain a traffic agent interaction feature. For example, feature dimensions of an encoding feature (Agent Feature) of the traffic agent encoding are A*T*C, feature dimensions of the traffic agent interaction feature are A*T*C, and the traffic agent performs temporal feature fusion to obtain a traffic agent fusion feature having feature dimensions A*C. Feature dimensions of static environment encoding (the static environment perception result) are L*C. Interaction encoding (attention interaction) is performed on the static environment encoding and the traffic agent fusion feature to obtain an interaction encoding feature having feature dimensions A*C.

Step S1012: Perform attention decoding on the interaction encoding feature to obtain an attention decoding result.

In this implementation, the attention decoding may be performed on the interaction encoding feature to obtain the attention decoding result. The attention decoding result includes an interaction encoding feature corresponding to a multimodal prediction and a scenario interaction result of the traffic agent.

Step S1013: Obtain the plurality of scenario interaction results based on the attention decoding result.

In this implementation, the plurality of scenario interaction results may be obtained based on the attention decoding result. To be specific, an interaction process between the environment of the vehicle and environment agents is abstracted into an attention network (Attention Net), and an exponential scenario complexity is reduced to the most likely scenario interaction results (for example, dozens of most likely scenario interaction results) for subsequent simulation calculations.

In an implementation, real interactive driving data can be used to train a spatio-temporal transformer net, so that the spatio-temporal transformer net obtains more accurate scenario interaction results. For example, the real interactive driving data can be annotated with interactive attention, and the spatio-temporal transformer net is trained using supervised learning.

In an implementation of this embodiment of the disclosure, step S103 may further include step S1031 and step S1032 as follows.

Step S1031: Obtain interaction scenarios at a plurality of consecutive moments in the future based on the initial interaction scenario and the ego vehicle driving decision of the vehicle.

In this implementation, step S1031 may include step S10311 and step S10312 as follows.

Step S10311: Obtain, for each moment, a plurality of interaction scenarios at the current moment based on interaction scenarios at a previous moment and the ego vehicle driving decision of the vehicle.

Step S10312: Obtain, based on scenario values of the interaction scenarios, an interaction scenario having the highest scenario value at the current moment as a final interaction scenario at the current moment, thereby obtaining the interaction scenarios at the plurality of consecutive moments in the future.

Figure 4:
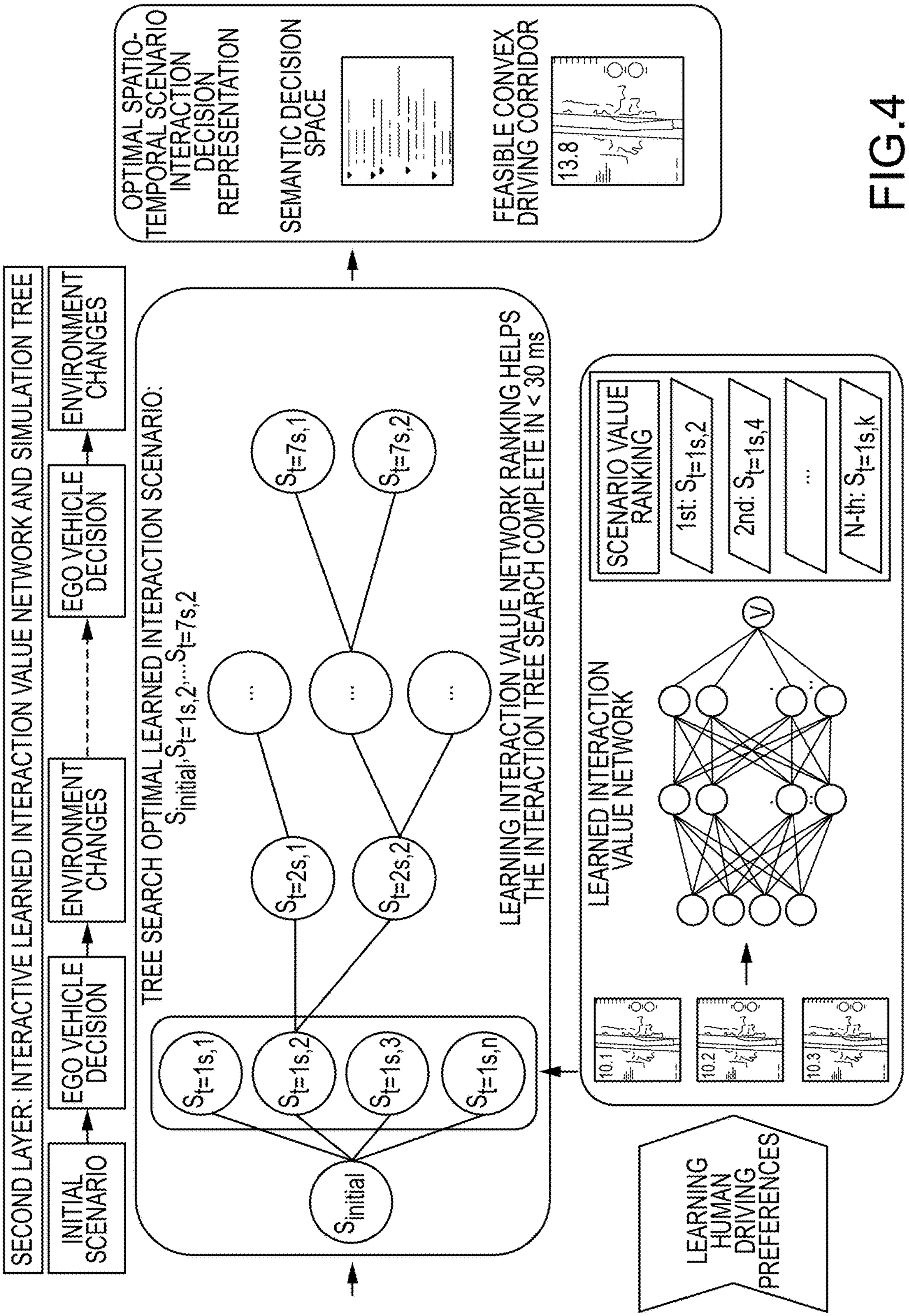
FIG. 4 is a schematic diagram of main processes of performing interaction scenario simulation using an interactive learned interaction value network and a simulation tree according to an implementation of an embodiment of the disclosure.

In this implementation, reference may be made to FIG. 4. FIG. 4 is a schematic diagram of main processes of performing interaction scenario simulation using an interactive learned interaction value network and a simulation tree according to an implementation of an embodiment of the disclosure. As shown in FIG. 4, interaction processes of all environment agents in the environment can be jointly considered. In a search tree of FIG. 4, the environment may change based on the initial scenario (the initial interaction scenario) and the ego vehicle decision (the ego vehicle driving decision), so that a plurality of interaction scenarios are obtained at a next moment. Over time, a new ego vehicle driving decision will be deduced at a new moment, thus producing more interaction scenarios. There is an interaction scenario having the highest scenario value among the interaction scenarios at each moment, so that the interaction scenario having the highest scenario value at each moment can be selected as a final interaction scenario at the current moment. That is, a tree search optimal learned interaction scenario in FIG. 4 is ($S_{initial}$, $S_{t=1s,2}$, . . . , $S_{t=7s,2}$).

In an implementation, the scenario values of the interaction scenarios can be determined through a trained preset learned interaction value network. The trained learned interaction value network may obtained by training based on annotated human driving behavior data, and the trained learned interaction value network assigns a higher scenario value to an interaction scenario that conforms to human driving behavior. As shown in FIG. 4, the learned interaction value network can be used to learn human driving preferences, thereby obtaining a ranking of the scenario values of the interaction scenarios. For example, a result of ranking the scenario values of the interaction scenarios at t=1s is 1nd:$S_{t=1s,2}$:2nd:$S_{t=1s,4}$; . . . ; N-th:St=1s,k. Game value network ranking can help simplify a search process of the interaction tree, greatly reducing a search time, such as completing it in <30 ms.

Step S1032: Obtain the optimal interaction scenario evolution feature based on a plurality of the interaction scenarios.

In this implementation, step S1032 may further include step S10321 and step S10322 as follows.

Step S10321: Obtain, based on a plurality of the interaction scenarios, a semantic decision space and a feasible convex driving corridor of each interaction scenario, where the semantic decision space includes interaction intentions of traffic agents in an interaction scenario having the highest scenario value, and the feasible convex driving corridor is time and space constraints on the interaction intentions.

Step S10322: Use the semantic decision space and the feasible convex driving corridor as the optimal interaction scenario evolution feature.

In this implementation, the semantic decision space and the feasible convex driving corridor of each interaction scenario may be obtained, and the semantic decision space and the feasible convex driving corridor may be used as the optimal interaction scenario evolution feature. The semantic decision space includes interaction intentions of traffic agents in an interaction scenario having the highest scenario value, and the feasible convex driving corridor is time and space constraints on the interaction intentions. The optimal interaction scenario evolution feature is an optimal spatio-temporal scenario interaction representation in FIG. 4, including the semantic decision space and the feasible convex driving corridor (the feasible convex space). Learning human driving preferences through the learned interaction value network can transform the high-dimensional search tree into a local convex space, effectively reducing an amount of data for subsequent calculations.

In an implementation, the learned interaction value network may include a reinforcement learning algorithm, and the scenario values of the interaction scenarios are obtained through the reinforcement learning algorithm.

In an implementation, step S104 may further include step S1041 to step S1043 as follows.

Step S1041: Perform, based on the optimal interaction scenario evolution feature, corresponding interaction intention encoding on each interaction intention included in the semantic decision space, and obtain a reward function corresponding to the interaction intention.

In this implementation, step S1041 may include step S10411 and step S10412 as follows.

Step S10411: Perform spatio-temporal joint feature embedding based on the optimal interaction scenario evolution feature, to obtain a spatio-temporal joint feature embedding result, where the spatio-temporal joint feature embedding refers to feature embedding encoding, in the feasible convex driving corridor, of temporal features and spatial features of the traffic agents in the semantic decision space.

Step S10412: Perform corresponding interaction intention encoding on each interaction intention based on the spatio-temporal joint feature embedding result, to obtain an interaction encoding result.

Figure 5:
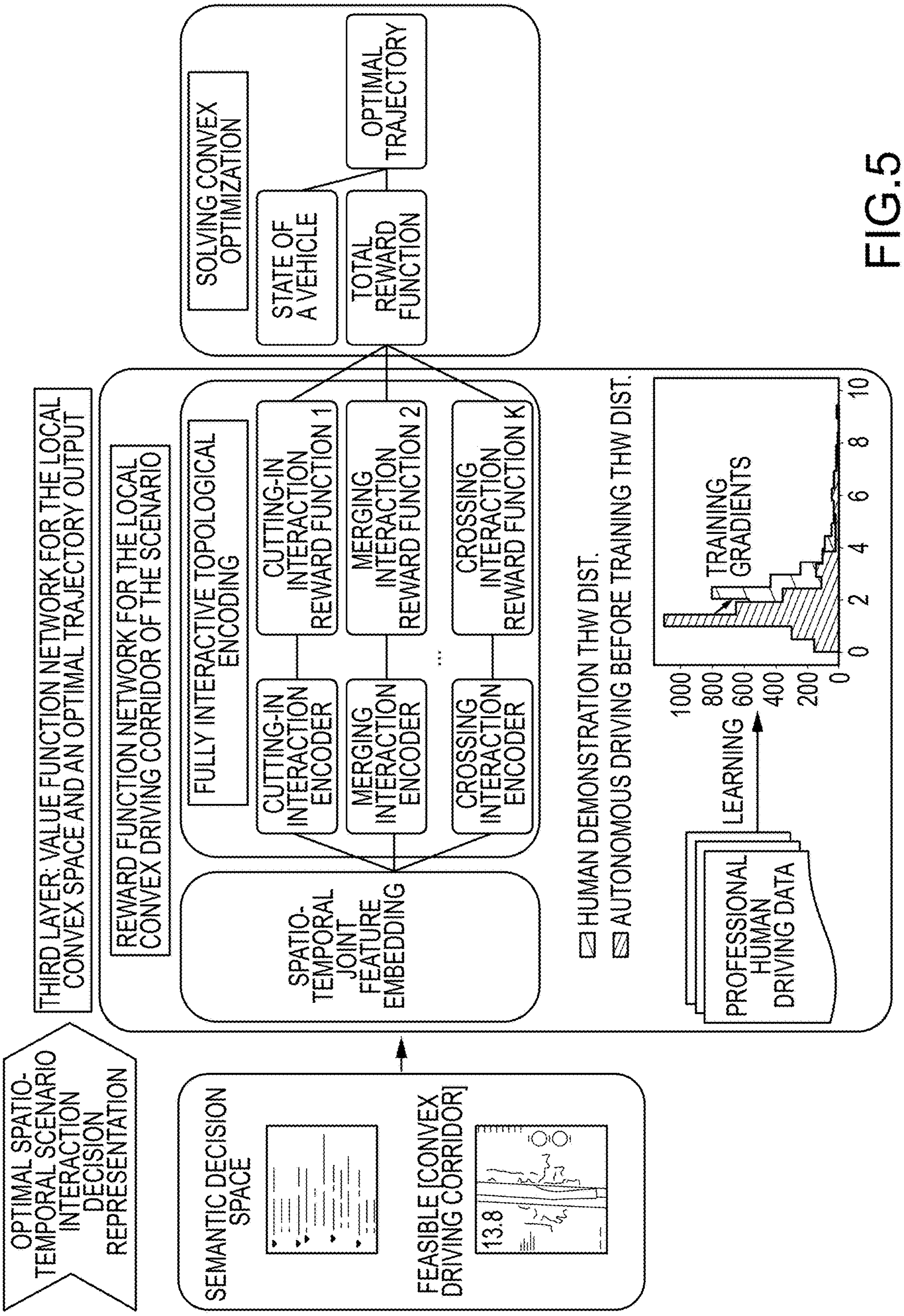
FIG. 5 is a schematic flowchart of main processes of obtaining an optimal driving trajectory according to an implementation of an embodiment of the disclosure.

In this implementation, reference may be made to FIG. 5. FIG. 5 is a schematic flowchart of main processes of obtaining an optimal driving trajectory according to an implementation of an embodiment of the disclosure. As shown in FIG. 5, spatio-temporal joint feature embedding, i.e., spatio-temporal joint feature embedding encoding, is performed on the optimal spatio-temporal scenario interaction decision representation (the optimal interaction scenario evolution feature) obtained in step S103 in the form of the semantic decision space and the feasible convex driving corridor. In addition, a reward function network for the local convex space of the scenario is established, and fully interactive topological encoding is performed based on the spatio-temporal joint feature embedding result, that is, the corresponding interaction intention encoding is performed for each interaction intention. For example, cutting-in interaction encoding is performed for a cutting-in interaction intention; merging interaction encoding is performed for a merging interaction intention; and crossing interaction encoding is performed for a crossing interaction intention.

In an implementation, the feature embedding encoding may be implemented through a concat function.

In an implementation, step S1041 may further include step S10413 as follows.

Step S10413: Train, based on human driving behavior data, the reward function in the feasible convex driving corridor to minimize a difference between an ego vehicle driving decision corresponding to the reward function and the human driving behavior data, thereby obtaining the reward function corresponding to the interaction intention.

In this implementation, as shown in FIG. 5, professional human driving data (human driving behavior data) can be used to learn the reward function, such that a difference between an ego vehicle driving decision corresponding to the reward function and the human driving behavior data is minimized. The difference may be obtained through training gradients during the training process. For example, a gradient descent method may be used to train the reward function. Training the reward function in the feasible convex driving corridor can effectively ensure the efficiency of training.

Step S1042: Obtain a total interaction reward function based on a plurality of interaction intentions and a reward function for each interaction intention.

In this implementation, the total interaction reward function may be obtained based on various interaction intentions and their corresponding reward functions.

In an implementation, weights of different interaction intentions may be determined based on the human driving behavior data, and the total interaction reward function may be obtained by weighting the reward functions of the different interaction intentions.

Step S1043: Obtain the optimal driving trajectory of the vehicle from the feasible convex driving corridor based on the total interaction reward function and the state of the vehicle.

In this implementation, a search for the optimal trajectory may be performed in the feasible convex driving corridor based on the total interaction reward function and the state of the vehicle to obtain the optimal driving trajectory of the vehicle. As shown in FIG. 6, to be specific, convex optimization is solved in the feasible convex driving corridor. Based on the state of the vehicle and the total reward function (the total interaction reward function), a more accurate search is performed in the feasible convex driving corridor to obtain the optimal trajectory (the optimal driving trajectory).

It should be noted that, although the steps are described in a specific order in the above embodiments, those skilled in the art may understand that in order to implement the effects of the disclosure, different steps are not necessarily performed in such an order, but may be performed simultaneously (in parallel) or in other orders, and these changes shall all fall within the scope of protection of the disclosure.

Those skilled in the art can understand that all or some of the procedures in the method of the foregoing embodiment of the disclosure may also be implemented by a computer program instructing relevant hardware. The computer program may be stored in a computer-readable storage medium, and when the computer program is executed by a processor, the steps of the foregoing method embodiments may be implemented. The computer program includes computer program codes, which may be in a source code form, an object code form, an executable file form, some intermediate forms, or the like. The computer-readable storage medium may include: any entity or apparatus that can carry the computer program code, a medium, a USB flash drive, a removable hard disk, a magnetic disk, an optical disc, a computer memory, a read-only memory, a random access memory, an electric carrier signal, a telecommunications signal, and a software distribution medium. It should be noted that the content included in the computer-readable storage medium may be appropriately added or deleted depending on requirements of the legislation and patent practice in a jurisdiction. For example, in some jurisdictions, according to the legislation and patent practice, the computer-readable storage medium does not include an electric carrier signal and a telecommunications signal.

Further, the disclosure further provides a control apparatus. In a control apparatus embodiment according to the disclosure, the control apparatus includes a processor and a storage apparatus. The storage apparatus may be configured to store a program for performing the method for predicting a vehicle trajectory in the foregoing method embodiment. The processor may be configured to execute a program in the storage apparatus, where the program includes, but is not limited to, the program for performing the method for predicting a vehicle trajectory in the foregoing method embodiment. For ease of description, only parts related to the embodiment of the disclosure are shown. For specific technical details that are not disclosed, refer to the method part of the embodiments of the disclosure. The control apparatus may be a control apparatus formed by various electronic devices.

The control apparatus in this embodiment of the disclosure may be a control apparatus formed by various electronic devices. In some possible implementations, the control apparatus may include a plurality of storage apparatuses and a plurality of processors. The program for performing the method for predicting a vehicle trajectory in the foregoing method embodiment may be divided into a plurality of subprograms, and each subprogram may be loaded and executed by the processor to perform different steps of the method for predicting a vehicle trajectory in the foregoing method embodiment. Specifically, each subprogram may be stored in a different storage apparatus, and each processor may be configured to execute programs in one or more storage apparatuses to jointly implement the method for predicting a vehicle trajectory in the foregoing method embodiment. In other words, each processor separately performs different steps of the method for predicting a vehicle trajectory in the foregoing method embodiment to jointly implement the method for predicting a vehicle trajectory in the foregoing method embodiment.

The plurality of processors may be processors deployed on a same device. For example, the foregoing control apparatus may be a high-performance device including a plurality of processors, and the plurality of processors may be processors configured on the high-performance device. Alternatively, the plurality of processors may be processors deployed on different devices. For example, the foregoing control apparatus may be a server cluster, and the plurality of processors may be processors on different servers in the server cluster.

Further, the disclosure further provides a computer-readable storage medium. In a computer-readable storage medium embodiment according to the disclosure, the computer-readable storage medium may be configured to store a program for performing the method for predicting a vehicle trajectory in the foregoing method embodiment, and the program may be loaded and executed by a processor to implement the foregoing method for predicting a vehicle trajectory. For ease of description, only parts related to the embodiment of the disclosure are shown. For specific technical details that are not disclosed, refer to the method part of the embodiments of the disclosure. The computer-readable storage medium may be a storage apparatus formed by various electronic devices. Optionally, the computer-readable storage medium in the embodiment of the disclosure is a non-transitory computer-readable storage medium.

Further, the disclosure further provides a vehicle. In a vehicle embodiment according to the disclosure, the vehicle includes the control apparatus in the control apparatus embodiment.

Further, it should be understood that, because the configuration of modules is merely intended to illustrate function units of the apparatus in the disclosure, physical devices corresponding to these modules may be a processor itself, or part of software, part of hardware, or part of a combination of software and hardware in the processor. Therefore, the number of modules in the figure is merely illustrative.

Those skilled in the art can understand that the modules in the apparatus may be adaptively split or merged. Such a split or combination of specific modules does not cause the technical solutions to depart from the principle of the disclosure. Therefore, technical solutions after any such split or combination shall all fall within the scope of protection of the disclosure.

Relevant user personal information that may be involved in various embodiments of the disclosure is personal information that is proactively provided by a processing user during the use of a product/service or produced from the use of the product/service and obtained with the user's authorization, strictly in accordance with requirements of laws and regulations, following the principles of legality, legitimacy, and necessity, and based on reasonable purposes of a business scenario.

The user personal information processed in the disclosure varies depending on the specific product/service scenario, and shall be subject to the specific scenario in which the user uses the product/service. It may involve account information, device information, driving information, vehicle information, or other related information of the user. The user's personal information and processing thereof shall be treated in the disclosure with a high degree of diligence.

The disclosure attaches great importance to the security of the user personal information, and reasonable and feasible security protection measures that comply with industry standards have been taken to protect information of the user and prevent the personal information from unauthorized access, public disclosure, use, modification, damage or loss.

Heretofore, the technical solutions of the disclosure have been described with reference to the preferred implementations shown in the accompanying drawings. However, those skilled in the art can readily understand that the scope of protection of the disclosure is apparently not limited to these specific implementations. Those skilled in the art may make equivalent changes or substitutions to the related technical features without departing from the principle of the disclosure, and all the technical solutions with such changes or substitutions shall fall within the scope of protection of the disclosure.

What is claimed is:

1. A method for predicting a vehicle trajectory, the method comprising:

determining, based on a static environment perception result and a traffic agent perception result of a vehicle at a current moment, a plurality of scenario interaction results of each traffic agent in an environment of the vehicle at the current moment, wherein the scenario interaction results represent different interaction intentions of the traffic agents;

determining an initial interaction scenario based on scenario interaction results of all traffic agents;

performing interaction scenario simulation based on the initial interaction scenario and an ego vehicle driving decision to obtain an optimal interaction scenario evolution feature, wherein the performing interaction scenario simulation comprises:

determining, for each of a plurality of consecutive moments in the future, a plurality of interaction scenarios based on interaction scenarios at a previous moment and the ego vehicle driving decision, wherein the initial interaction scenario and the plurality of interaction scenarios are distributions of interaction intentions of the traffic agents at a corresponding moment;

inputting the plurality of interaction scenarios into a machine learning model trained with real driving data to generate a ranking of the plurality of interaction scenarios for each consecutive moment; and selecting, for each consecutive moment, an interaction scenario with the highest rank; and determining an optimal driving trajectory for autonomously driving the vehicle based on the optimal interaction scenario evolution feature and a state of the vehicle by:

obtaining a semantic decision space and a feasible convex driving corridor, wherein the semantic decision space comprises interaction intentions of traffic agents in the interaction scenario having the highest rank, and wherein the feasible convex driving corridor corresponds to temporal and spatial constraints on the interaction intentions of the traffic agents in the interaction scenario having the highest rank;

performing corresponding interaction intention encoding on a cutting-in interaction scenario, a merging interaction scenario, and a crossing interaction scenario comprised in the semantic decision space, and determining corresponding reward functions to yield a cutting-in interaction reward function, a merging interaction reward function, and a crossing reward function;

determining a total interaction reward function based on the cutting-in interaction reward function, the merging interaction reward function, and the crossing reward function; and determining the optimal driving trajectory for autonomously driving the vehicle from the feasible convex driving corridor based on the total interaction reward function and the state of the vehicle.

2. The method for predicting a vehicle trajectory according to claim 1, wherein the real driving data comprises labeled human driving behavior data, and the ranking of the plurality of interaction scenarios is based on whether an interaction scenario conforms to human driving behavior.

3. The method for predicting a vehicle trajectory according to claim 1, wherein performing the corresponding interaction intention encoding comprises:

performing spatio-temporal joint feature embedding based on the optimal interaction scenario evolution feature, to obtain a spatio-temporal joint feature embedding result, wherein the spatio-temporal joint feature embedding refers to feature embedding encoding, in the feasible convex driving corridor, of temporal features and spatial features of the traffic agents in the semantic decision space; and performing the corresponding interaction intention encoding based on the spatio-temporal joint feature embedding result, to obtain an interaction encoding result.

4. The method for predicting a vehicle trajectory according to claim 1, wherein determining the corresponding reward functions comprises:

training, based on human driving behavior data, each reward function in the feasible convex driving corridor to minimize a difference between the ego vehicle driving decision corresponding to the reward function and the human driving behavior data.

5. The method for predicting a vehicle trajectory according to claim 1, wherein determining the plurality of scenario interaction results of each traffic agent in the environment of the vehicle at the current moment comprises:

performing attention interaction encoding based on the static environment perception result and the traffic agent perception result to obtain an interaction encoding feature;

performing attention decoding on the interaction encoding feature to obtain an attention decoding result; and obtaining the plurality of scenario interaction results based on the attention decoding result.

6. The method for predicting a vehicle trajectory according to claim 5, wherein the performing attention interaction encoding comprises:

performing attention interaction for the traffic agent perception results of different traffic agents to obtain a traffic agent interaction feature;

fusing the traffic agent interaction feature and a temporal feature to obtain a traffic agent fusion feature; and performing attention interaction for the traffic agent fusion feature and the static environment perception result to obtain the interaction encoding feature.

7. A control apparatus, comprising:

at least one processor and at least one storage apparatus configured to store a plurality of program codes, wherein the program codes are adapted to be loaded and executed by the processor to perform a method for predicting a vehicle trajectory, the method comprising:

determining, based on a static environment perception result and a traffic agent perception result of the vehicle at a current moment, a plurality of scenario interaction results of each traffic agent in an environment of the vehicle at the current moment, wherein the scenario interaction results represent different interaction intentions of the traffic agents;

determining an initial interaction scenario based on scenario interaction results of all traffic agents;

performing interaction scenario simulation based on the initial interaction scenario and an ego vehicle driving decision to obtain an optimal interaction scenario evolution feature, wherein the performing interaction scenario simulation comprises:

determining, for each of a plurality of consecutive moments in the future, a plurality of interaction scenarios based on interaction scenarios at a previous moment and the ego vehicle driving decision, wherein the initial interaction scenario and the plurality of interaction scenarios are distributions of interaction intentions of the traffic agents at a corresponding moment;

inputting the plurality of interaction scenarios into a machine learning model trained with real driving data to generate a ranking of the plurality of interaction scenarios for each consecutive moment; and selecting, for each consecutive moment, an interaction scenario with the highest rank; and determining an optimal driving trajectory for autonomously driving the vehicle based on the optimal interaction scenario evolution feature and a state of the vehicle by:

obtaining a semantic decision space and a feasible convex driving corridor, wherein the semantic decision space comprises interaction intentions of traffic agents in the interaction scenario having the highest rank, and wherein the feasible convex driving corridor corresponds to temporal and spatial constraints on the interaction intentions of the traffic agents in the interaction scenario having the highest rank:

performing corresponding interaction intention encoding on a cutting-in interaction scenario, a merging interaction scenario, and a crossing interaction scenario comprised in the semantic decision space, and determining corresponding reward functions to yield a cutting-in interaction reward function, a merging interaction reward function, and a crossing reward function;

determining a total interaction reward function based on the cutting-in interaction reward function, the merging interaction reward function, and the crossing reward function; and determining the optimal driving trajectory for autonomously driving the vehicle from the feasible convex driving corridor based on the total interaction reward function and the state of the vehicle.

8. The control apparatus according to claim 7, wherein the real driving data comprises labeled human driving behavior data, and the ranking of the plurality of interaction scenarios is based on whether an interaction scenario conforms to human driving behavior.

9. The control apparatus according to claim 7, wherein performing the corresponding interaction intention encoding comprises:

performing spatio-temporal joint feature embedding based on the optimal interaction scenario evolution feature, to obtain a spatio-temporal joint feature embedding result, wherein the spatio-temporal joint feature embedding refers to feature embedding encoding, in the feasible convex driving corridor, of temporal features and spatial features of the traffic agents in the semantic decision space; and performing the corresponding interaction intention encoding based on the spatio-temporal joint feature embedding result, to obtain an interaction encoding result.

10. The control apparatus according to claim 7, wherein determining the corresponding reward functions comprises:

training, based on human driving behavior data, each reward function in the feasible convex driving corridor to minimize a difference between the ego vehicle driving decision corresponding to the reward function and the human driving behavior data.

11. The control apparatus according to claim 7, wherein determining the plurality of scenario interaction results of each traffic agent in the environment of the vehicle at the current moment comprises:

performing attention interaction encoding based on the static environment perception result and the traffic agent perception result to obtain an interaction encoding feature;

performing attention decoding on the interaction encoding feature to obtain an attention decoding result; and obtaining the plurality of scenario interaction results based on the attention decoding result.

12. A vehicle, comprising the control apparatus according to claim 7.

* * * * *